UNITED STATES PATENT OFFICE.

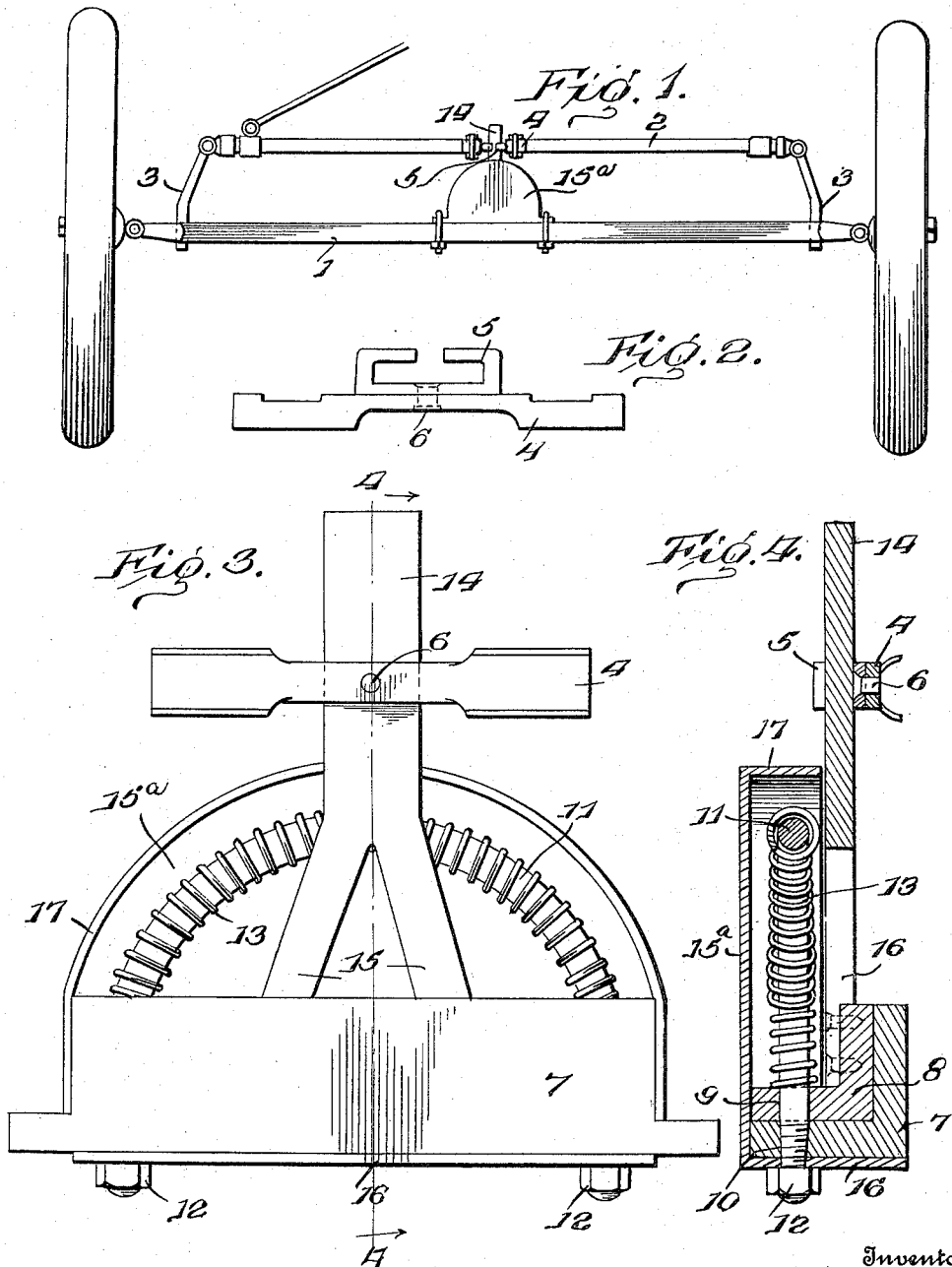

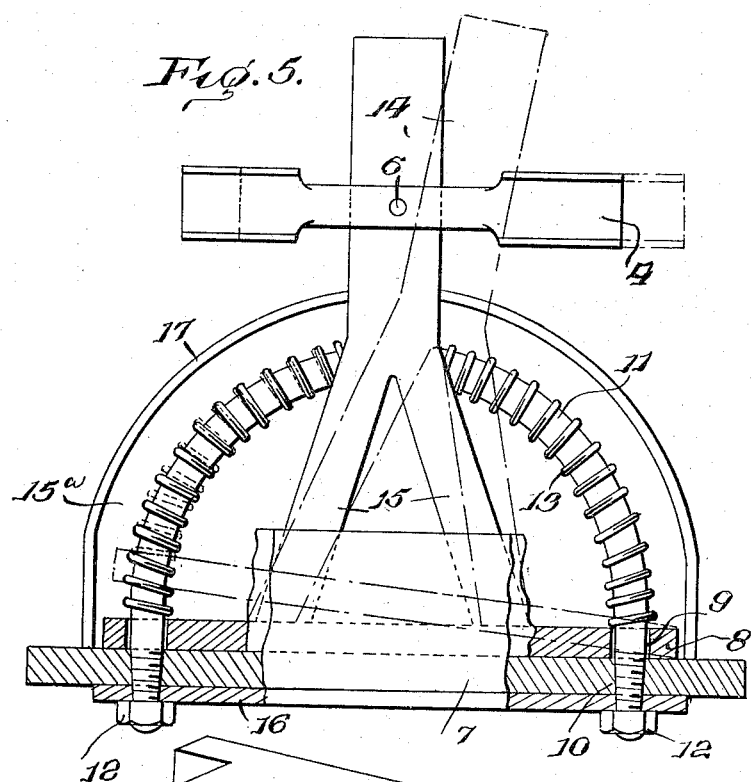
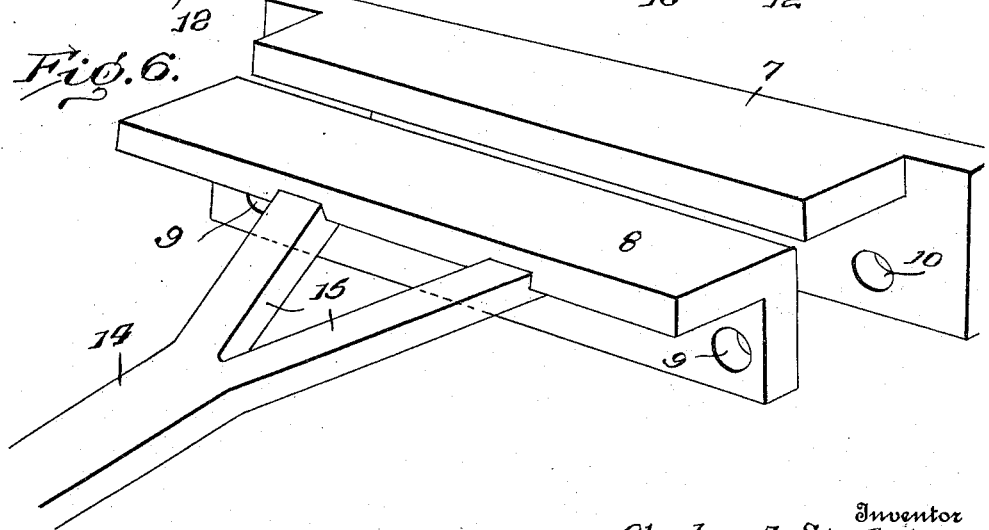

CHARLES A. STAPLETON, OF ANTHONY, KANSAS, ASSIGNOR OF ONE-HALF TO OTHA P. BURCHFIEL, OF ANTHONY, KANSAS.

SAFETY APPLIANCE FOR MOTOR-VEHICLE STEERING MECHANISM.

1,226,138.  Specification of Letters Patent.  Patented May 15, 1917.

Application filed August 10, 1915. Serial No. 44,802.

*To all whom it may concern:*

Be it known that I, CHARLES A. STAPLETON, a citizen of the United States, residing at Anthony, in the county of Harper and State of Kansas, have invented certain new and useful Improvements in Safety Appliances for Motor-Vehicle Steering Mechanism, of which the following is a specification.

The primary purpose of this invention is to relieve the driver of a motor vehicle of the fatigue and exertion experienced when operating a machine for a considerable length of time, particularly when driving over rough and uneven roads.

The invention provides a device for yieldingly holding the pilot or front wheels of a motor vehicle in a given position so that when driving over a straight road the operator may with safety relax the hold upon the steering wheel. This relates to the type of steering mechanism requiring the steering wheel to be grasped at all times while the machine is in motion so as to preclude the diverting of the vehicle from a straight course by one or the other of the front wheels dropping into a depression or passing over an obstruction.

A further purpose of the invention is to relieve the driver of the annoyance, discomfort and ill effects of the hands and arms being subjected to shock and vibration and to interpose in the steering mechanism an appliance for neutralizing such shock and vibration as well as normally holding the front wheels in a straight ahead course.

The invention also has for its object the provision of a device which may be readily applied to the steering mechanism of motor vehicles in use and upon the market without requiring any change in the parts thereof.

A further purpose of the invention is to provide an appliance of the nature and for the purpose herein specified which is simple in construction, effective for the purpose intended and positive and certain in operation.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,

Figure 1 is a top plan view of the front axle and link connecting the arms of the steering knuckles showing a safety means embodying the invention associated therewith;

Fig. 2 is a front view of the connection attached to the link forming the tie between the arms of the steering knuckles;

Fig. 3 is a view of the safety device as seen from the underside;

Fig. 4 is a longitudinal section on the line 4—4 of Fig. 3;

Fig. 5 is a view similar to Fig. 3 partly in section and showing one adjustment by dotted lines;

Fig. 6 is a perspective view of the parts comprising the frame of the device.

The device comprises two parts, one attached to the front axle 1 of the motor vehicle and the other secured to the link 2 connecting the arms 3 projecting from the steering knuckles. The part attached to the link 2 may be clipped or otherwise secured thereto and comprises a bar 4 and a guide 5 connected to the bar 4 in a manner to swivel thereon. The guide 5 consists of a link and is connected to the bar 4 by means of a pivot 6.

The part secured to the axle 1 comprises two members 7 and 8, each preferably of L-shape in cross section. The member 8 is disposed in the angle comprised between the wings or flanges forming part of the member 7. The registering openings 9 and 10 are formed in the wings or flanges of the members which occupy a relatively vertical position when the device is in operative position. The wings or flanges occupying a relatively horizontal position overlap each other and mutually form a guide to hold the members 7 and 8 in a given position and direct the same in their relative movements. A curved rod 11 has its end portions passed through the openings 9 and 10 and provided at their projecting ends with nuts 12 or like means constituting stops and serving to secure the rod 11 to the part 7. While the curved rod 11 is secured to the member 7 the member 8 is free to have a limited movement upon such rod. The openings 9 formed in the vertical wing or flange of the member 8 are of such size as to admit of the member 8 having a pivotal movement upon the rod 11, as indicated by the dotted lines in Fig. 5. An expansible spring 13 of helical form is mounted upon the rod 11 with its ends abutting against the outer side of the vertical wing, or flange of the member 8. This spring is normally under tension and serves to hold the member 8 close against the member 7.

An arm 14 projects from the member 8 and may form a part thereof or be secured thereto in any manner. The inner end of the arm 14 is forked, as shown at 15, and the forked members are attached to the horizontal wing or flange of the member 8 and serve to brace the arm 14. The outer end of the arm 14 passes through the guide 5. Movement of the outer end of the arm 14 laterally in one direction or the other causes a corresponding movement of the member 8, one end of such member remaining in contact with the vertical flange or wing of the member 7 whereas the opposite end moves away from the vertical flange or wing of the member 7, as indicated by dotted lines in Fig. 5. The pivotal movement of the member 8 increases the tension of the spring 13 by compressing such spring, as will be readily understood. When the force exerted to move the arm 14 and member 8 from a normal position is released or relaxed, the spring 13 regaining itself returns such parts to the predetermined position.

When the safety appliance is in operative position the member 7 is secured to the axle 1 and the bracket connection is attached to the link 2. The outer end of the arm 14 engages the guide 5. When the device is properly positioned it operates normally to hold the front or pilot wheels of the vehicle in a position parallel with the length of the vehicle. Movement of the link 2 to the right or to the left subjects the spring 13 to an increased tension and effects a pivotal movement of the arm 14 and member 8. The tendency of the spring 13 is to hold the member 8 close against the member 7 and to bring the arm 14 in a position parallel with the length of the machine so as to hold the front or pilot wheels in a position straight ahead. As a result of the action of the spring 13 it is possible for the driver to relax the hold upon the steering wheel or to remove the hands therefrom particularly when the vehicle is moving over a direct course. It is observed, furthermore, that the shock and vibration sustained by the front wheels are neutralized by the spring 13, thereby relieving the hands and arms of the driver in a great measure of the ill effects resulting from being subjected to the jar and shock incident to having the shock and jar expended upon the hands and arms. When the link 2 moves in one direction the connection attached thereto likewise moves and causes a pivotal movement of the member 8 and arm 14, as indicated by dotted lines in Fig. 5, and when the link 2 moves in the opposite direction the member 8 and arm 14 receive a reverse pivotal movement. In either case one end of the member 8 remains in contact with the member 7 and the opposite end of the member 8 moves away from the member 7, thereby increasing the tension of the spring 13. It is to be understood that the tension of the spring 13 is such as to normally hold the member 8 against the member 7 and the arm 14 in a direct line so as to maintain the front wheels of a vehicle in a straight course.

The spring 13 and rod 11 are protected by a suitable housing which is arranged thereabove, the same consisting of a plate 15$^a$, which is provided along one edge with a depending flange 16, the opposite edge of such plate being made rounding to conform to the circular outline of the rod 11 and having a depending flange 17. The depending flange 16 extends along the vertical flange or wing of the member 7 and is confined between such member and the axle 1. The housing also conceals the spring 13 and its supporting rod 11.

Having thus described the invention, what is claimed as new is:—

1. In a safety appliance for the steering mechanism of motor vehicles, an axle member comprising angularly disposed wings, a link member arranged in the angle formed between the wings of the axle member and comprising angularly disposed wings, an arm projecting from the link member, a curved rod passing through a wing of the link member and attached to the adjacent wing of the axle member, and an expansible helical spring mounted upon the curved rod and arranged to exert a pressure against opposite ends of the link member.

2. In a safety appliance for the steering mechanism of motor vehicles, an axle member comprising angularly disposed wings, a link member arranged in the angle formed between the wings of the axle member and comprising angularly disposed wings, an arm projecting from the link member, a curved rod passing through a wing of the link member and attached to the adjacent wing of the axle member, an expansible helical spring mounted upon the curved rod and arranged to exert a pressure against opposite ends of the link member, and a housing extending over the curved rod and spring and consisting of a plate having depending flanges, the one extending along the outer side of the spring and rod and the other projecting along a side of the axle member.

In testimony whereof I affix my signature.

CHARLES A. STAPLETON. [L. S.]

Copies of this patent may be obtained for five cents each, by addressing the "Commissioner of Patents Washington, D. C."